United States Patent [19]

Wonn

[11] 4,126,514

[45] Nov. 21, 1978

[54] METHOD FOR DETECTING AND LOCATING DEFECTIVE NUCLEAR REACTOR FUEL ELEMENTS

[75] Inventor: James W. Wonn, Irwin, Pa.

[73] Assignee: Westinghouse Electric Corp., Pittsburgh, Pa.

[21] Appl. No.: 656,991

[22] Filed: Feb. 11, 1976

Related U.S. Application Data

[63] Continuation-in-part of Ser. No. 513,914, Oct. 10, 1974, abandoned.

[30] Foreign Application Priority Data

Sep. 10, 1975 [FR] France .............................. 75 30943

[51] Int. Cl.² ............................................ G21C 17/00
[52] U.S. Cl. ............................ 176/19 LD; 176/19 R; 73/590; 73/592
[58] Field of Search .................. 176/19; 73/67.8, 67.9

[56] References Cited

U.S. PATENT DOCUMENTS

| | | | |
|---|---|---|---|
| 2,280,226 | 4/1942 | Firestone | 73/67.8 |
| 2,846,875 | 8/1958 | Grabendorfer | 73/67.8 |
| 3,063,290 | 11/1962 | Kasserman et al. | 73/67.8 |
| 3,066,525 | 12/1962 | Harris | 73/67.8 |
| 3,240,674 | 3/1966 | Ledwidge | 176/19 R |
| 3,299,696 | 1/1967 | Dickinson | 73/67.8 |
| 3,350,271 | 10/1967 | Maidment et al. | 176/19 R |
| 3,387,257 | 6/1968 | Brech | 73/67.8 |
| 3,597,316 | 8/1971 | Lynworth | 176/19 R |
| 3,603,139 | 9/1971 | Ying | 73/67.9 |
| 3,715,914 | 2/1973 | Gross et al. | 176/19 R |
| 3,780,571 | 12/1973 | Wiesner | 176/19 R |
| 3,936,348 | 2/1976 | Wachter et al. | 176/19 LD |
| 3,945,245 | 3/1976 | Stehle et al. | 176/19 LD |

Primary Examiner—Samuel W. Engle
Assistant Examiner—S. A. Cangialosi
Attorney, Agent, or Firm—D. C. Abeles; Z. L. Dermer

[57] ABSTRACT

A method for detecting and locating defective fuel elements in a liquid cooled nuclear reactor employing a sonic/ultrasonic dual test. In accordance with the invention acoustic transducers, sensitive to a broad range of frequencies ranging from the audio to ultrasonic range, are respectively coupled to the exposed top end plugs of the fuel elements of a nuclear reactor fuel assembly. The respective fuel assemblies are voided of coolant, raising the temperature of the individual elements to a point that will boil any liquid coolant present in a defective fuel tube. The audio output of each transducer is translated into a graphic display identifying the presence and location of defective fuel elements. At prescribed intervals passive acoustic monitoring is interrupted for a pulse-echo attenuation measurement of each element. The respective transducers are sequentially energized, communicating pulsed acoustic energy along the fuel element cladding. Attenuation of the acoustic pulses, propagating along the cladding, is highly dependent upon small quantities of moisture in contact with the inside surface of the cladding. The respective transducers monitor attenuation of the reflected energy as a further indication of fuel element defects.

9 Claims, 6 Drawing Figures

METHOD FOR DETECTING AND LOCATING DEFECTIVE NUCLEAR REACTOR FUEL ELEMENTS

This application is a continuation-in-part of application Ser. No. 513,914, filed Oct. 10, 1974, now abandoned and assigned to the same assignee as this application.

BACKGROUND OF THE INVENTION

Field of the Invention

This invention pertains generally to a method for detecting and locating defective nuclear reactor fuel elements and more particularly to such a method employing a sonic/ultrasonic dual test.

In liquid cooled nuclear reactors radioactive pellets are generally employed as the source of thermal energy. The pellets, enclosed within hermetically sealed thin walled tubular claddings commonly referred to as fuel elements, are expected to withstand extremely high internal temperatures and external pressures. The elements are supported in an ordered spaced array within fuel assemblies having fluid flow channels longitudinally extending along the outer cladding surface of the respective elements. The coolant medium of the reactor is circulated through the assemblies to maintain the elements within a prescribed temperature range. The thickness of the element cladding is a compromise that provides minimum neutron capture cross section and adequate fuel support. However, in the unlikely event of adverse operating conditions, minute rupture of the cladding walls can occur, exposing the interior of the element to small quantities of the cooling liquid. Under such conditions, the probability of resulting contamination to the primary coolant and degradation of the fuel assemblies reliability makes it imperative that a technique be devised to determine the presence of defective elements and their location.

While several methods presently exist for generally indicating the presence of failed nuclear fuel, such as are disclosed in the patents to Weiss et al, U.S. Pat. No. 3,786,257, issued Jan. 15, 1974 and Douet et al, U.S. Pat. No. 3,395,074, issued July 30, 1968, the methods described do not have the capability of identifying the location of specific fuel element failures.

Accordingly, a new method is desired that will identify the presence of defective fuel elements and their specific locations. It is additionally desirable to provide such a method that will have a measure of redundancy. Furthermore, it is advantageous, to provide such a method that will not only identify defective fuel having a cracked cladding wall but also fuel elements having a number of excessively swollen fuel pellets.

SUMMARY OF THE INVENTION

Briefly, this invention overcomes the deficiencies of the prior art by providing a method for detecting and locating defective nuclear reactor fuel elements. In accordance with one test of this method the exterior surface of the fuel element cladding is substantially isolated from contact with the cooling liquid normally employed to maintain the assembly within a prescribed temperature band. Either one or both of two complementary acoustic tests are performed to provide an indication of the presence of cooling moisture within the fuel elements, indicative of a rupture in the element cladding. In one such test, employing a pulse echo attenuation measurement, identifies the presence of a number of excessively swollen fuel pellets can be identified.

In accordance with one embodiment, an acoustic pulsed signal is generated, coupled to the top plug of the fuel element and propagated along the cladding wall. A measure of the presence of either cooling liquid within the element or a number of excessively swollen fuel pellets is achieved by appropriate interpretation of echo pulses received at the transducer.

In the second embodiment the exterior surface of the fuel element cladding is substantially isolated from contact with the cooling liquid normally employed to maintain the element within a prescribed temperature band. The audio frequency noise generated by boiling coolant within the element is monitored as an indication of a cladding failure.

In this manner, two sets of data are generated, each sensitive to different manifestations of fuel failures. The resultant redundancy increases the probability of detection of such failures while minimizing erroneous results.

BRIEF DESCRIPTION OF THE DRAWINGS

For better understanding of the invention, reference may be had to the preferred embodiment, exemplary of the invention, shown in the accompanying drawings, in which.

DESCRIPTION OF THE PREFERRED EMBODIMENT

Figure 1:
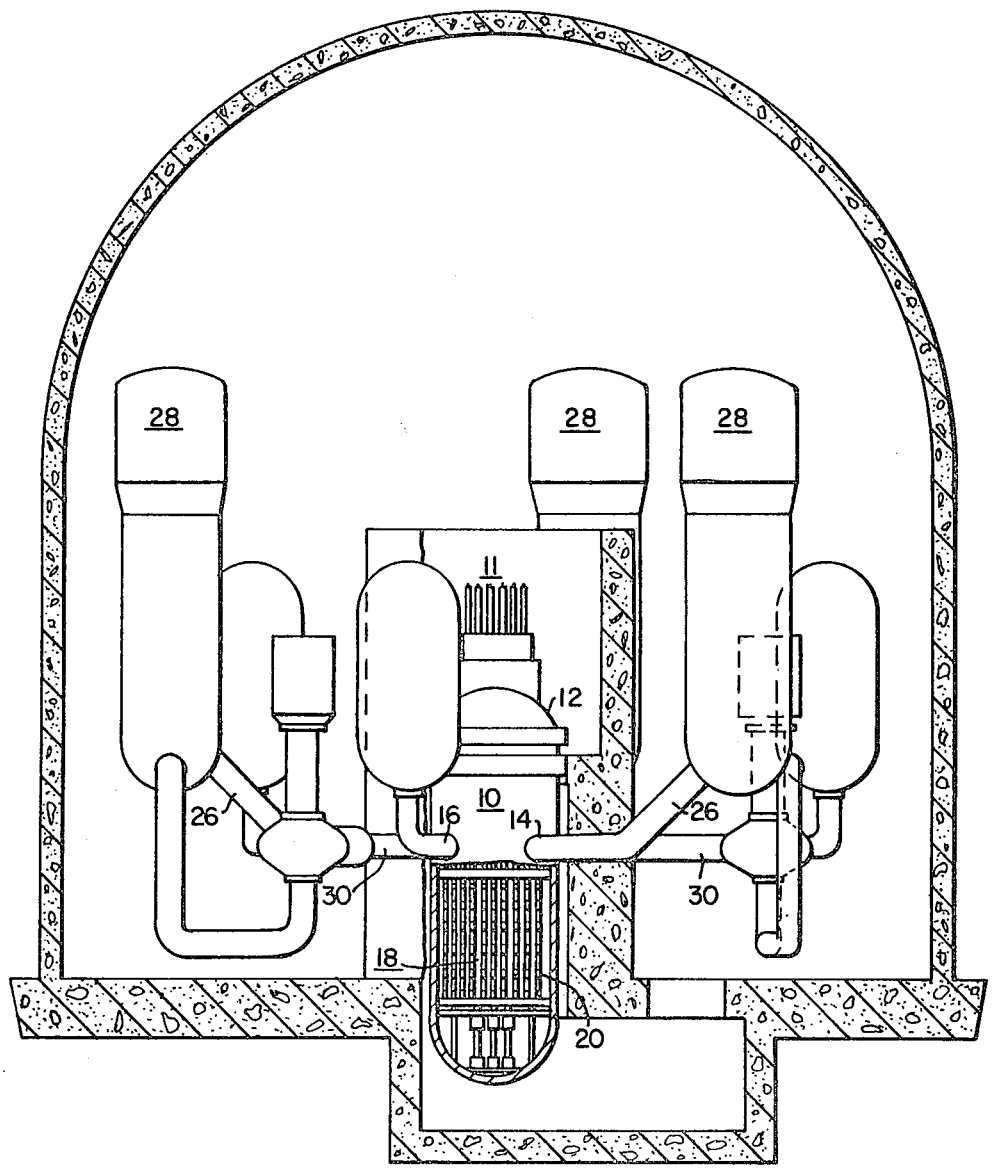
FIG. 1 is a plan view of a nuclear reactor steam generating system.

FIG. 1 shows a plan view of a typical pressurized water reactor steam generating system which can be operated in accordance with the method of this invention to provide both an indication of the presence and location of failed nuclear fuel elements. The reactor of FIG. 1 includes a vessel 10 which forms a pressurized container when sealed by its head assembly 12. The vessel has coolant flow inlet means 16 and coolant flow outlet means 14 formed integral with and through its cylindrical walls. As is known in the art, the vessel 10 contains a nuclear core 18 consisting mainly of a plurality of clad nuclear fuel elements 20 which generate substantial amounts of heat depending primarily upon the position of part length and full length control rods having an exterior pressure housing 11. The heat generated by the reactor core 18 is conveyed from the core by coolant flow entering through inlet means 16 and exiting through outlet means 14. Generally the flow exiting through outlet means 14 is conveyed through an outlet conduit 26 to a heat exchange steam generator system 28, wherein the heated coolant flow is conveyed through tubes which are in heat exchange relationship with water which is utilized to produce steam. The steam produced by the generator is commonly utilized to drive a turbine for the production of electricity. The flow of the coolant is conveyed from the steam generator 28 through a cool leg conduit 30 to inlet means 16. Thus a closed recycling primary or steam generating loop is provided with the coolant piping coupling the vessel 10 and the steam generator 28. The vessel illustrated in FIG. 1 is adaptable for three such closed fluid flow systems or loops, though, it should be understood that the number of such loops may vary from plant to plant, and commonly two, three, or four are employed.

Figure 2:
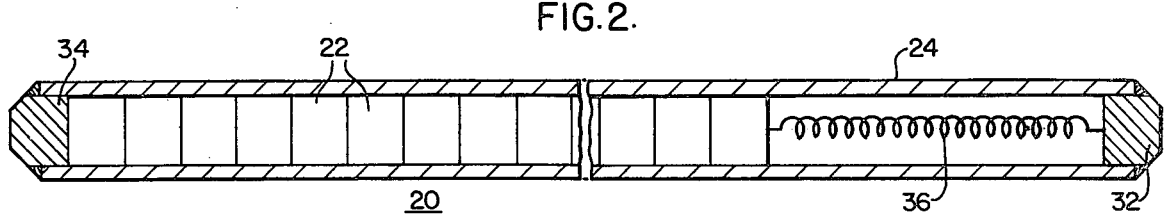
FIG. 2 is a sectional view of a typical reactor fuel element.
Figure 5:
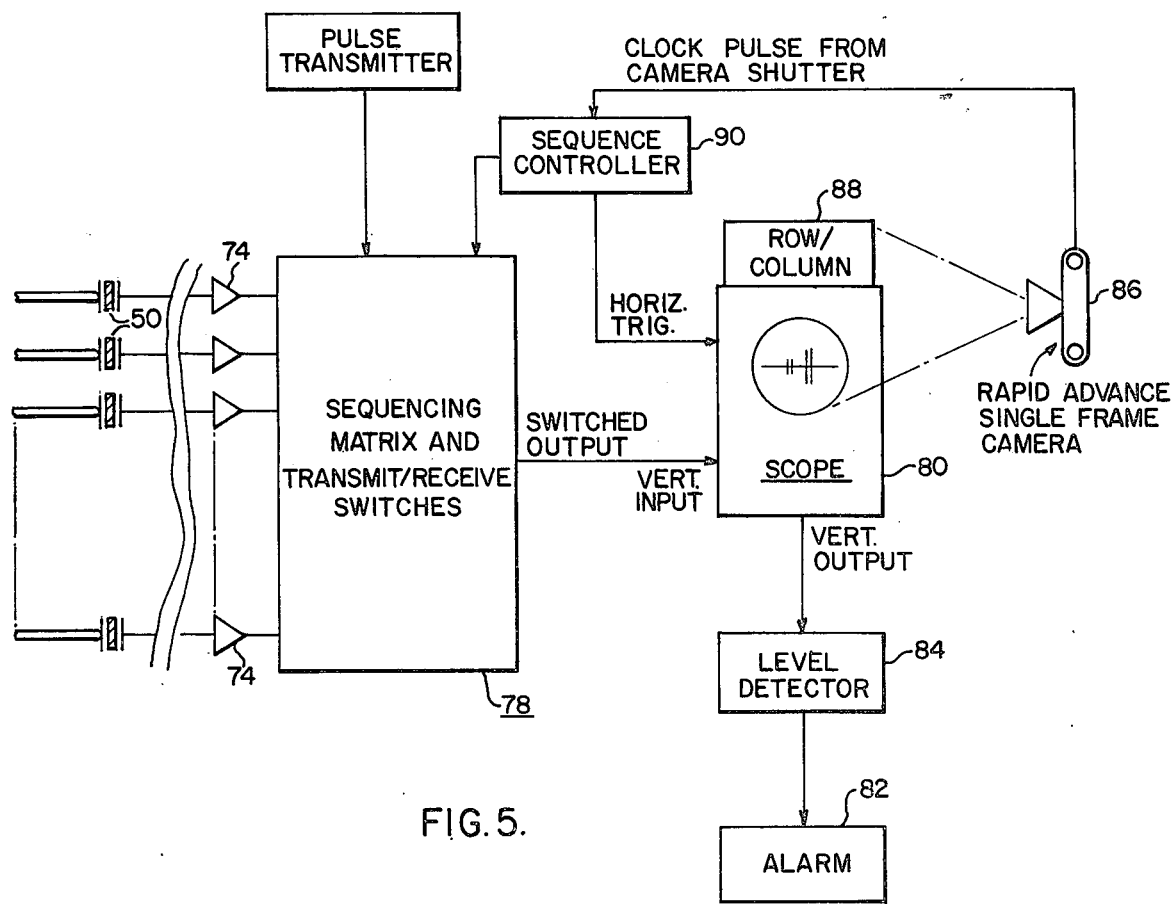
FIG. 5 is a schematic illustration of a real time display arrangement for presenting the information provided by one mode of operation of this invention.

Referring to the sectional view of a nuclear fuel element illustrated in FIG. 2 it can be appreciated that the fuel pellets 22 are positioned in a tandem closely packed array, enclosed by a tubular cladding 24 which is hermetically sealed at each end by a pair of end plugs 32 and 34. The pellets are maintained in closely packed configuration by spring assembly 36 normally positioned between the pellets and the top end plug 32 of the element.

Figure 3:
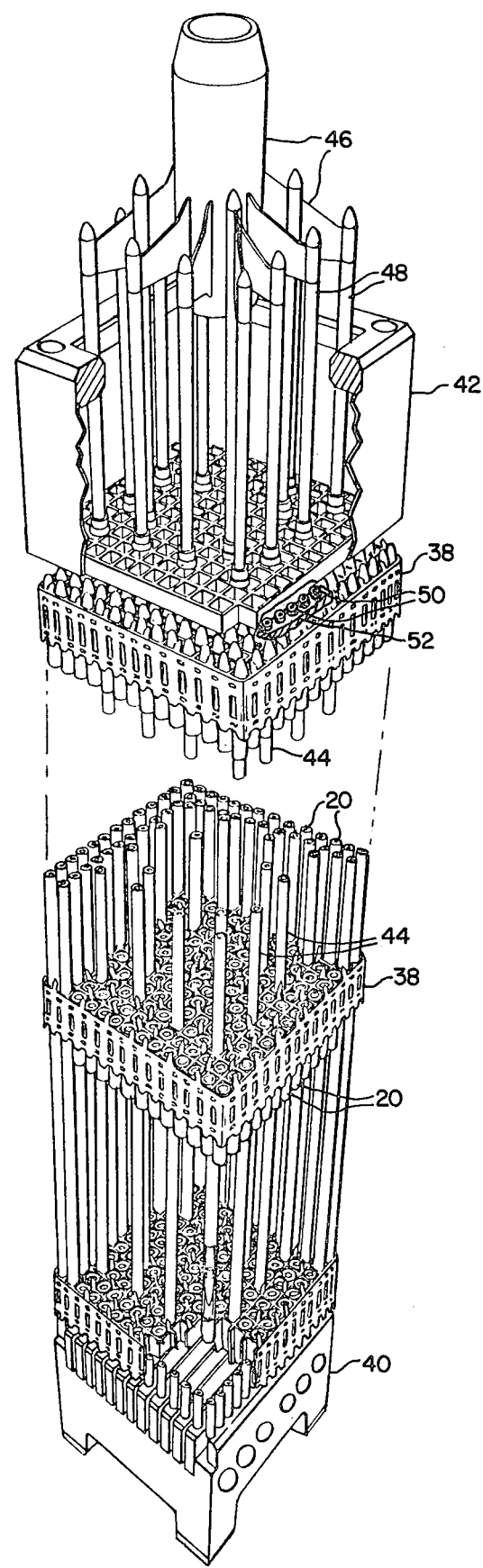
FIG. 3 is a perspective view of a partial nuclear reactor fuel assembly incorporating the acoustic transducers employed in the method of this invention.

A single fuel assembly in a number of reactors operating today, includes 196 fuel elements in a 14 × 14 square bundle. A perspective of such an assembly is illustrated in FIG. 3 which shows the relative position of the fuel elements 20 maintained and supported in spaced relationship by grid assemblies 38. Interspersed among the fuel rods are control rod sheaths 44, which guide the absorber rods 48 into an out of void fuel locations within the grid structure. The control rods in a given assembly are manipulated by a single spider assembly 46 coupled to a control rod drive mechanism through a mechanical linkage drive rod connection not shown. The upper and lower portions of the assembly are respectively enclosed by coolant flow nozzles 42 and 40, which guide the flow of coolant from the lower portion of the assembly up through the grid structures, along the fuel rods to the upper nozzle, where the coolant is directed through the external coolant piping by way of the outlet means 14 to the steam generator system.

In a 14 × 14 fuel assembly array the fuel elements are approximately 12 feet 6 inches long with an outside diameter of 0.422 inches and a 0.060 space provided between adjacent tubes for the flow of coolant. Cladding walls are designed to have as small a thickness as possible to minimize the neutron capture cross section. Under adverse operating conditions it is possible for small cracks to form in the fuel cladding, resulting in a degree of contamination of the reactor coolant and degradation of the fuel assembly's reliability. Thus, it is desirable to provide a mechanism for detecting and locating such failures so that defective elements can be replaced without the necessity of scrapping entire fuel assemblies.

In general, as can be appreciated from the perspective view illustrated in FIG. 3, the only portion of the elements accessible for inspection is the top end plug and approximately the first half inch of the cladding exterior. Any inspection technique employed must be performed remotely so as to avoid exposure to the radioactive environment surrounding the fuel. Visible inspection of the walls by closed circuit television surveillance will yield data only as to those tubes on the perimeter of the assembly and not the interior units.

This invention provides a sonic/ultrasonic dual test which not only identifies the presence of a failed fuel element, but also its location. With this information it is possible to provide an estimated savings of approximately $1.5 million dollars per plant by replacing faulty elements in assemblies instead of discarding the entire array.

Figure 4:
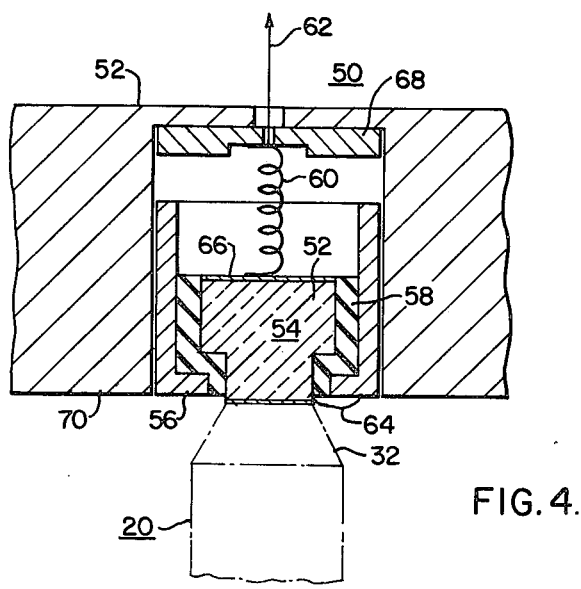
FIG. 4 is an exemplary transducer design which can be employed in the method of this invention.

The acoustic transducer 50 employed in accomplishing the steps contemplated by this invention is affixed to the upper end plug 32 of the respective fuel elements in a manner to promote good acoustic coupling. The transducers are designed to be sensitive to both audio and ultrasonic frequencies. One such transducer is illustrated in FIG. 4, though, it should be understood that a number of ultrasonic transducers having a broad band of frequency response exist in the art. A 14 × 14 mosaic of transducers are mounted in a stainless steel plate 52 to mate with the top end plugs of the exemplary fuel assembly. The plate will index the mosaic of transducer elements to match up with the exposed top end plugs of the individual elements. A line of five such transducers is shown in FIG. 3.

Each ceramic piezoelectric element 54 is shock mounted in a stainless steel thimble 56 concentrically positioned within a washer of silicone rubber 58 for adjacent channel isolation. The assembly is biased against the end plug by a spring-loaded electrode 60 which accommodates variations in fuel element length. The contacting surface of the piezoelectric element is grounded to the thimble and the output is communicated from the back electrode 66, through the spring loaded electrode 60 to the exterior of the housing 62. An alumina washer 68 isolates the output from the stainless steel supporting plate 70.

A trade off exists in achieving good sensitivity for both audio and ultrasonic frequency ranges. Inasmuch as the low frequency response is proportional to the thickness of the piezo-ceramic disc, a thicker than normal width of PZT-4 is employed. Sensitivity to the higher frequency ranges is achieved by operating at the thickness mode fundamental or one of its overtone resonances.

Thus, in accordance with this invention the ultrasonic transducer 50 is operated in two modes to provide a pulse echo measurement and passive monitoring at audio frequencies for reception of liquid boiling emissions within the element.

The pulse echo measurement is an effective indicator of cladding rupture because any moisture present within a fuel element will affect the ultrasonic attenuation characteristics of the cladding in a manner similar to the way water droplets increase the acoustic loss on a thin wire ultrasonic waveguide. Normally a small gap exists between the fuel pellets and the cladding wall. Moisture within the fuel element enhances acoustic coupling between the pellets and the cladding. The fuel pellets coupled in this manner act to dampen the acoustic signal. Hence the attenuation characteristics of the moistened cladding is enhanced to a recognizable degree. Furthermore, characteristic echoes are produced by swollen fuel pellets in contact with the cladding. With the fuel assembly voided of liquid coolant so that the individual elements are isolated from contact with the liquid normally surrounding the outer cladding surface, the attenuation of an acoustic pulse propagating down the cladding will be highly dependent upon small quantities of moisture within the element. Even with moisture surrounding the outer cladding surface experimental results have shown that measurable attenuation of the received reflected signal will be sensed as a result of improved acoustic coupling between the cladding wall and the fuel pellets either due to a number of excessively swollen pellets or the presence of moisture within the cladding. The ultrasonic pulse will traverse the tube and be reflected off the far end plug, traveling a return path to the transducer for reception. The amplitude of the received signal can then be compared to a standard as a measure of the integrity of the fuel element.

Experimental results have shown that the echo from the far end of the cladding is highly sensitive to small amounts of water injected into the element with or without the coolant voided from contact with the external cladding surface. One drop of water injected produced a 3 db reduction in echo level at a pulse carrier frequency of 1 MHz and a 6.5 db reduction at 630 KHz. The attenuation rises very quickly until at 3 drops of injected water, pulses at both carrier frequencies were down at least 30 db below the pulse level corresponding to no water at all.

The end echo level of several such experiments containing no water at all were quite consistent and repeatable so that a good indication of contained water can be associated with a low level end echo alone. Tests made on an actual fuel assembly verified the consistent amplitude of the end echo pulse.

The possibility of swollen uranium pellets inside a fuel element exists and will contribute to the measured end echo loss, as previously mentioned, by back scattering some energy of the propagating pulse. In addition, some information is contained in the scattered echoes themselves. The power reflected by a simulated swollen pellet was not enough to decrease the end echo by more than 1 db. This is negligible compared with the decrease associated with the presence of water inside an element. In the event enough pellets are swollen to produce a total loss approaching that of a leaking tube (approximately ten pellets), this alone would likely be sufficient grounds for replacing the element as defective, and thus adds an advantage to the results provided by the test of this method.

In addition, the requirement of voiding the liquid coolant from around the assembly results in a temperature rise of the individual radiated fuel elements. In fuel elements containing liquid coolant moisture, this rise in temperature will quickly reach the boiling point. The audio frequency noise generated by boiling coolant will be readily transmitted to the end of the fuel element through a waveguide effect. The transducer 50 has been designed to have good sensitivity at audio frequencies as well as high output and sensitivity at the higher pulse-echo carrier frequencies. In this manner, the audio frequency noise associated with the boiling coolant within the element is monitored alternatively with the pulse echo measurement. The result is a redundancy which increases the probability of detection of a leaky fuel element while reducing the probability of obtaining erroneous information.

Figure 6:
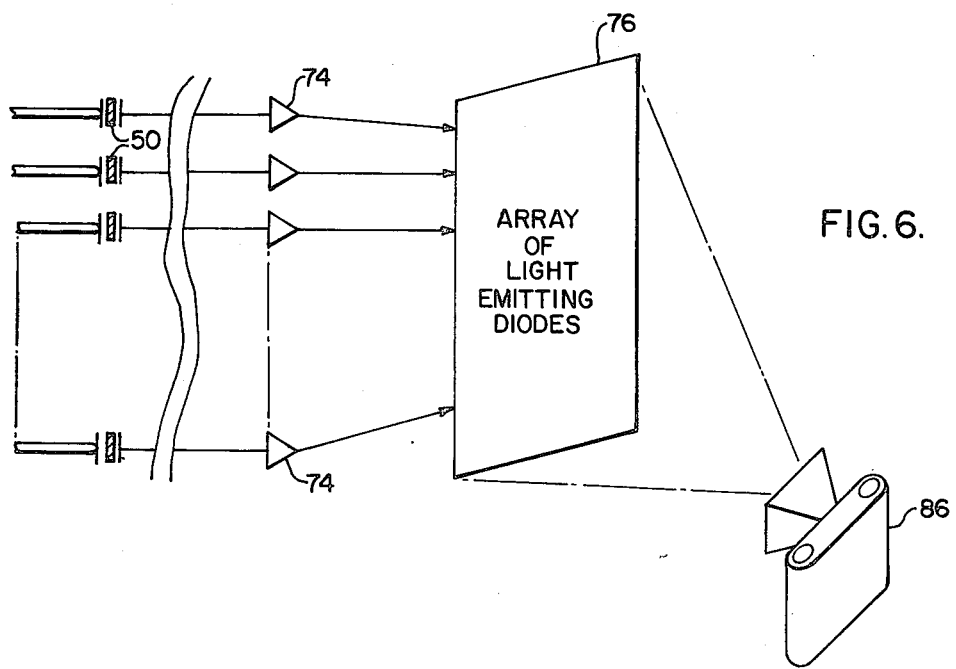
FIG. 6 is a schematic illustration of a real time display system for presenting the information supplied by a second mode of operation of this invention.

Passive monitoring from boiling noise should extend over the entire time the fuel elements are hot enough to produce boiling to maximize the probability of detection. The fuel elements in this portion of the test are voided of surrounding coolant to the extent necessary to achieve boiling within the element cladding. The audio output of each of the 196 transducers in a 14 × 14 fuel assembly array is amplified, as schematically illustrated by the parallel arrangement of amplifiers 74 shown in FIG. 6, to a level capable of driving a corresponding light emitting diode position in an appropriate location in a 14 × 14 matrix display. Thus, a visual output is made available as on-line data for the plant operator and a movie can be simultaneously taken of the display for a permanent file or additional analysis without rerunning the tests.

Desirably, the boiling noise passive monitoring procedure is briefly interrupted periodically for approximately five seconds while a single pulse echo test is performed on each fuel element. As will be appreciated by those skilled in the art the total test can be completed in less than one minute which as is well known, will not affect the integrity of the fuel. A system for implementing the pulse echo test is illustrated. The input electronics to the sequencing matrix 78 is similar to the passive monitoring system previously described. The sequencing matrix includes a number of relays for connecting the transmitter to each transducer sequentially. Following the period of transmission of a single transducer, the received echo is displayed on a scope 80. A camera 86 is provided to establish a permanent record of the output and an alarm 82, energized by a minimum level detector 84, will alert the plant operator. The rapid advance single frame camera 86 records the echo displayed on the scope and an alphanumeric readout 88 of the corresponding row and column. The shutter of the camera is used to supply the clock pulse to the sequence controller 90 which selects the next fuel element to be interrogated. The round trip pulse travel time in a given fuel element is approximately 2 microseconds. Accordingly, the time required to sequence through the entire 196 fuel elements is determined by the advancing rate of the camera. A typical rate of 50 frames per second will enable 196 pulse echo tests to be performed in approximately four seconds, providing a minimum of interruption to the passive listening test.

With some additional circuit complexity, the light emitting diode display board can display and hold an indication of the received pulse amplitude for each fuel element to aid the operator and provide real time cross-correlation of the dual test results. One advantage of using a light emitting diode display is the fast response it provides to signal variations. In addition, the relatively low driving power requirements of a light emitting diode display makes it directly compatible with integrated circuit operational amplifiers and logic circuitry outputs.

Thus, in addition to providing an indication and location of failed nuclear fuel elements the method of this invention provides a mechanism for distinguishing between failures due to leaking fuel elements and those due to excessively swollen pellets. A positive result from both test modes will assure the presence of an element having a cracked cladding wall, while a positive result only from the pulse echo attenuation measurement will provide an indication of swollen pellets. Accordingly, defective fuel elements, once identified, can be replaced to assure the design operating life of the fuel assembly.

What is claimed is:

1. A method for detecting and locating a defective nuclear reactor fuel element normally maintained within an assembly having an ordered array of a plurality of spaced fuel elements respectively comprising fissile material enclosed within an acoustically conductive tubular cladding hermetically sealed at either end with the space between fuel elements defining fluid flow channels for the passage of a cooling liquid among the elements of the array, including the steps of:

generating an acoustic signal exterior of the cladding;

propagating the acoustic signal along the fuel element cladding;

monitoring reflections of the propagated signal occurring at a preestablished given location along the axial length of the cladding; and correlating the attenuation of the monitored signal over the amplitude of the generated signal to a preestablished standard corresponding to a level of attenuation indicative of the presence of the cooling liquid within the element.

2. The method of claim 1 wherein the generating and monitoring steps are performed by a single ultrasonic transducer which is acoustically coupled to the cladding.

3. The method of claim 1 for monitoring a plurality of fuel elements within a fuel assembly including the steps of:

displaying an output indication of a defective fuel element in response to an indication of the presence of the cooling liquid within the element; and identifying in the display the location within the fuel assembly of the defective fuel element.

4. The method of claim 1 wherein the tubular cladding is hermetically sealed at either end respectively with an end cap and the acoustic signal generated exterior of the cladding is acoustically coupled at one end through one end cap to the cladding and the reflections monitored are off of the other end cap.

5. The method of claim 1 wherein the generating and receiving steps are performed within intermittent prescribed intervals including the steps of: substantially isolating the exterior surface of the fuel element cladding from contact with the cooling liquid to the extent necessary to raise the temperature of the element to the degree necessary to boil any moisture within the interior of the fuel cladding; and monitoring the fuel element for audio frequency noise generated from boiling cooling liquid within the fuel element during the period between the intermittent intervals as a further indication of the presence of the liquid cooling medium within the element.

6. The method of claim 5 wherein the generation and reception of the propagated signal and the reception of the audio noise is performed by a single transducer.

7. A method for detecting and locating a defective nuclear reactor fuel element normally maintained within an assembly having an ordered array of a plurality of spaced fuel elements respectively comprising fissile material enclosed within an internally dry tubular cladding hermetically sealed at either end with the space between fuel elements defining fluid flow channels for the passage of a cooling liquid among the elements of the array, including the steps of:

raising the temperature of the fuel element above the boiling point of the cooling liquid by reducing the heat transfer rate from the interior of the fuel element to the exterior of the fuel element cladding below that employed to maintain the fuel element within its prescribed operating temperature band; and monitoring the fuel element end cap for audio frequency noise generated within the fuel element by the boiling cooling liquid.

8. The method of claim 7 wherein the temperature of the fuel element is raised by substantially isolating the exterior surface of the fuel element cladding from contact with the cooling liquid to the extent necessary to raise the fuel element temperature to the degree necessary to boil any moisture within the fuel element cladding.

9. A method for detecting a defect in a hermetically sealed internally dry tubular cladding at least partially filled with irradiated ceramic nuclear fuel pellets comprising the steps of:

immersing the cladding within a liquid;

internally raising the temperature of the cladding above the boiling point of any of the liquid that may be present within the cladding by reducing the heat transfer rate from the interior of the fuel element to the exterior of the fuel element cladding below that employed to maintain the fuel element within its prescribed operating temperature band; and monitoring the cladding for acoustic energy originating from the liquid within the cladding thereby identifying a defect which has enabled the liquid to seep into the normally dry interior of the cladding.

* * * * *